United States Patent
Suzuki et al.

(10) Patent No.: US 10,623,148 B2
(45) Date of Patent: Apr. 14, 2020

(54) TERMINAL APPARATUS, BASE STATION APPARATUS, COMMUNICATION METHOD, AND INTEGRATED CIRCUIT

(71) Applicant: SHARP KABUSHIKI KAISHA, Sakai, Osaka (JP)

(72) Inventors: Shoichi Suzuki, Sakai (JP); Tatsushi Aiba, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/093,623

(22) PCT Filed: Feb. 20, 2017

(86) PCT No.: PCT/JP2017/006170
§ 371 (c)(1),
(2) Date: Oct. 13, 2018

(87) PCT Pub. No.: WO2017/179298
PCT Pub. Date: Oct. 19, 2017

(65) Prior Publication Data
US 2019/0074934 A1    Mar. 7, 2019

(30) Foreign Application Priority Data
Apr. 13, 2016 (JP) ................. 2016-080159

(51) Int. Cl.
*H04L 1/18* (2006.01)
*H04L 1/00* (2006.01)
(Continued)

(52) U.S. Cl.
CPC .............. *H04L 1/1812* (2013.01); *H04J 1/00* (2013.01); *H04L 1/0073* (2013.01);
(Continued)

(58) Field of Classification Search
CPC ..................................................... H04L 1/1812
(Continued)

(56) References Cited

U.S. PATENT DOCUMENTS

2013/0077465 A1* 3/2013 Sasaki .................. H04L 1/1861
370/208

FOREIGN PATENT DOCUMENTS

WO    2012/005123 A1    1/2012

OTHER PUBLICATIONS

"Definition of Q'min for UCI on PUSCH", R1-106095, Sharp, 3GPP TSG RAN WG1 Meeting #63, Jacksonville, USA, Nov. 15-19, 2010.
(Continued)

*Primary Examiner* — Peter G Solinsky
(74) *Attorney, Agent, or Firm* — ScienBiziP, P.C.

(57) ABSTRACT

Aspects relate to a terminal apparatus that uses a PUSCH that includes a transport block to transmit a HARQ-ACK, and that codes the HARQ-ACK. A number Q' of coded modulation symbols of the HARQ-ACK is (i) an output of a max function to which $Q'_{temp}$ and $Q'_{min}$ are input, and (ii) an output of a min function to which $4 \cdot M^{PUSCH}_{sc}$ is input; the $M^{PUSCH}_{sc}$ is a scheduled bandwidth for transmission of the PUSCH in a subframe for the transport block and is represented by a number of subcarriers; the max function is a function configured to output a largest value among a plurality of input values; and the min function is a function configured to output a smallest value among a plurality of input values. Thus, the HARQ-ACK can be transmitted efficiently.

12 Claims, 11 Drawing Sheets

| Modulation order $Q_m$ | Encoded HARQ-ACK |
|---|---|
| 2 for QPSK | $[o_0\ o_1\ o_2\ o_0\ o_1\ o_2]$ |
| 4 for 16QAM | $[o_0\ o_1\ x\ x\ o_2\ o_0\ x\ x\ o_1\ o_2\ x\ x]$ |
| 6 for 64QAM | $[o_0\ o_1\ x\ x\ x\ x\ o_2\ o_0\ x\ x\ x\ x\ o_1\ o_2\ x\ x\ x\ x]$ |

(51) Int. Cl.
| | |
|---|---|
| *H04L 5/00* | (2006.01) |
| *H04J 1/00* | (2006.01) |
| *H04W 28/04* | (2009.01) |
| *H04L 27/26* | (2006.01) |
| *H04L 5/14* | (2006.01) |
| *H04L 1/08* | (2006.01) |

(52) U.S. Cl.
CPC .......... *H04L 1/0081* (2013.01); *H04L 5/0055* (2013.01); *H04L 27/2605* (2013.01); *H04W 28/04* (2013.01); *H04L 1/08* (2013.01); *H04L 5/001* (2013.01); *H04L 5/0023* (2013.01); *H04L 5/14* (2013.01); *H04L 27/2602* (2013.01); *H04L 27/2636* (2013.01)

(58) Field of Classification Search
USPC .......................................................... 370/329
See application file for complete search history.

(56) References Cited

OTHER PUBLICATIONS

"3rd Generation Partnership Project;Technical Specification Group Radio Access Network; Evolved Universal Terrestrial Radio Access (E-UTRA);Multiplexing and channel coding(Release 13)", 3GPP TS 36.212 V13.1.0 (Mar. 2016).

Lenovo, Correction on HARQ-ACK bit concatenation for PUCCH format 4 and 5 ,3GPP TSG-RAN WG1 #84 R1-161005,Feb. 2016.

"3rd Generation Partnership Project;Technical Specification Group Radio Access Network; Evolved Universal Terrestrial Radio Access (E-UTRA)and Evolved Universal Terrestrial Radio Access Network(E-UTRAN);Overall description;Stage 2 (Release 13)", 3GPP TS 36.300 V13.2.0 (Dec. 2015).

"New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, Dec. 8-11, 2014.

"3rd Generation Partnership Project;Technical Specification Group Radio Access Network; Evolved Universal Terrestrial Radio Access (E-UTRA);Physical channels and modulation(Release 13)", 3GPP TS 36.211 V13.1.0 (Mar. 2016).

"3rd Generation Partnership Project;Technical Specification Group Radio Access Network; Evolved Universal Terrestrial Radio Access (E-UTRA);Physical layer procedures(Release 13)",3GPP TS 36.213 V13.1.1 (Mar. 2016).

Samsung, Ericsson, ST-Ericsson, Sharp, LG, WF on Q'min for UCI on PUSCH, 3GPP TSG-RAN WG1 #63 R1-106486. Jan. 2010.

* cited by examiner

| Modulation order $Q_m$ | Encoded HARQ-ACK |
|---|---|
| 2 for QPSK | $[o_0\ y]$ |
| 4 for 16QAM | $[o_0\ y\ x\ x]$ |
| 6 for 64QAM | $[o_0\ y\ x\ x\ x\ x]$ |

FIG. 8

| Modulation order $Q_m$ | Encoded HARQ-ACK |
|---|---|
| 2 for QPSK | $[o_0\ o_1\ o_2\ o_0\ o_1\ o_2]$ |
| 4 for 16QAM | $[o_0\ o_1\ x\ x\ o_2\ o_0\ x\ x\ o_1\ o_2\ x\ x]$ |
| 6 for 64QAM | $[o_0\ o_1\ x\ x\ x\ x\ o_2\ o_0\ x\ x\ x\ x\ o_1\ o_2\ x\ x\ x\ x]$ |

FIG. 9

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

FIG. 10

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied. In LTE, a base station apparatus is also referred to as an evolved NodeB (eNodeB), and a terminal apparatus is also referred to as a User Equipment (UE). LTE is a cellular communication system in which multiple areas are deployed with a cellular structure, with each of the multiple areas being covered by a base station apparatus. A single base station apparatus may manage multiple cells.

LTE supports a Time Division Duplex (TDD). LTE that employs the TDD scheme is also referred to as TD-LTE or LTE TDD. In TDD, uplink signals and downlink signals are time division multiplexed. Furthermore, LTE supports a Frequency Division Duplex (FDD).

In LTE Release 13, simultaneous transmission and/or reception by a terminal apparatus in a plurality of serving cells (component carriers) are standardized (NPL 2, 3, 4, 5). In addition, in LTE Release 13, transmission of HARQ-ACK by a terminal apparatus using PUSCH is standardized (NPL 3 and 4).

CITATION LIST

Non Patent Literature

NPL 1: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.
NPL 2: "3GPP TS 36.211 V13.1.0 (2016-03)", 29 Mar. 2016.
NPL 3: "3GPP TS 36.212 V13.1.0 (2016-03)", 29 Mar. 2016.
NPL 4: "3GPP TS 36.213 V13.1.1 (2016-03)", 31 Mar. 2016.
NPL 5: "3GPP TS 36.300 V13.2.0 (2015-12)", 13 Jan. 2015.
NPL 6: "Definition of Q'min for UCI on PUSCH", R1-106095, Sharp, 3GPP TSG RAN WG1 Meeting #63, Jacksonville, USA, 15-19 Nov. 2010.

SUMMARY OF INVENTION

Technical Problem

The present invention provides a terminal apparatus capable of efficiently transmitting a HARQ-ACK, a communication method used by the terminal apparatus, an integrated circuit implemented in the terminal apparatus, a base station apparatus capable of efficiently receiving a HARQ-ACK, a communication method used by the base station apparatus, and an integrated circuit implemented in the base station apparatus.

Solution to Problem (1) According to some aspects of the present invention, the following measures are provided. That is, a first aspect of the present invention relates to a terminal apparatus including: a transmitter configured to transmit a HARQ-ACK using a PUSCH that includes a transport block; and a coding unit configured to code the HARQ-ACK, wherein a number Q' of coded modulation symbols of the HARQ-ACK is (i) an output of a max function to which $Q'_{temp}$ and $Q'_{min}$ are input, and (ii) an output of a min function to which $4 \cdot M^{PUSCH}{}_{sc}$ is input, the $M^{PUSCH}{}_{sc}$ is a scheduled bandwidth for transmission of the PUSCH in a subframe for the transport block, and is represented by a number of subcarriers, the max function is a function configured to output a largest value among a plurality of input values, and the min function is a function configured to output a smallest value among a plurality of input values.

(2) A second aspect of the present invention relates to a base station apparatus including: a receiver configured to receive a HARQ-ACK using a PUSCH that includes a transport block; and a decoding unit configured to decode the HARQ-ACK, wherein a number Q' of coded modulation symbols of the HARQ-ACK is (i) an output of a max function to which $Q'_{temp}$ and $Q'_{min}$ are input, and (ii) an output of a min function to which $4 \cdot M^{PUSCH}{}_{sc}$ is input, the $M^{PUSCH}{}_{sc}$ is a scheduled bandwidth for transmission of the PUSCH in a subframe for the transport block, and is represented by a number of subcarriers, the max function is a function configured to output a largest value among a plurality of input values, and the min function is a function configured to output a smallest value among a plurality of input values.

(3) A third aspect of the present invention relates to a communication method for use by a terminal apparatus, the communication method including: transmitting a HARQ-ACK by using a PUSCH that includes a transport block; and coding the HARQ-ACK, wherein a number Q' of coded modulation symbols of the HARQ-ACK is (i) an output of a max function to which $Q'_{temp}$ and $Q'_{min}$ are input, and (ii) an output of a min function to which $4 \cdot M^{PUSCH}{}_{sc}$ is input, the $M^{PUSCH}{}_{sc}$ is a scheduled bandwidth for transmission of the PUSCH in a subframe for the transport block, and is represented by a number of subcarriers, the max function is a function configured to output a largest value among a plurality of input values, and the min function is a function configured to output a smallest value among a plurality of input values.

(4) A fourth aspect of the present invention relates to a communication method for use by a base station apparatus, the communication method including: receiving a HARQ-ACK by using a PUSCH that includes a transport block; and decoding the HARQ-ACK, wherein a number Q' of coded modulation symbols of the HARQ-ACK is (i) an output of a max function to which $Q'_{temp}$ and $Q'_{min}$ are input, and (ii) an output of a min function to which $4 \cdot M^{PUSCH}{}_{sc}$ is input, the $M^{PUSCH}{}_{sc}$ is a scheduled bandwidth for transmission of the PUSCH in a subframe for the transport block, and is represented by a number of subcarriers, the max function is a function configured to output a largest value among a plurality of input values, and the min function is a function configured to output a smallest value among a plurality of input values.

(5) A fifth aspect of the present invention relates to an integrated circuit implemented in a terminal apparatus, the integrated circuit including: a transmission circuit configured to transmit a HARQ-ACK by using a PUSCH that includes a transport block; and a coding circuit configured to code the HARQ-ACK, wherein a number Q' of coded modulation symbols of the HARQ-ACK is (i) an output of a max function to which $Q'_{temp}$ and $Q'_{min}$ are input, and (ii) an output of a min function to which $4 \cdot M^{PUSCH}{}_{sc}$ is input, the $M^{PUSCH}{}_{sc}$ is a scheduled bandwidth for transmission of the PUSCH in a subframe for the transport block, and is represented by a number of subcarriers, the max function is a function configured to output a largest value among a plurality of input values, and the min function is a function configured to output a smallest value among a plurality of input values.

(6) A sixth aspect of the present invention relates to an integrated circuit implemented in a base station apparatus, the integrated circuit including: a receiving circuit configured to receive a HARQ-ACK by using a PUSCH that includes a transport block; and a decoding circuit configured to decode the HARQ-ACK, wherein a number Q' of coded modulation symbols of the HARQ-ACK is (i) an output of a max function to which $Q'_{temp}$ and $Q'_{min}$ are input, and (ii) an output of a min function to which $4 \ M^{PUSCH}{}_{sc}$ is input, the $M^{PUSCH}{}_{sc}$ is a scheduled bandwidth for transmission of the PUSCH in a subframe for the transport block, and is represented by a number of subcarriers, the max function is a function configured to output a largest value among a plurality of input values, and the min function is a function configured to output a smallest value among a plurality of input values.

Advantageous Effects of Invention

According to the present invention, the terminal apparatus can efficiently transmit a HARQ-ACK. In addition, the base station apparatus can efficiently receive the HARQ-ACK.

BRIEF DESCRIPTION OF DRAWINGS

FIG. 8 is a diagram illustrating an example of a HARQ-ACK coding process according to the present embodiment.

FIG. 9 is a diagram illustrating an example of a HARQ-ACK coding process according to the present embodiment.

FIG. 10 is a diagram illustrating an example of a base sequence $M_{i,n}$ according to the present embodiment.

DESCRIPTION OF EMBODIMENTS

Embodiments of the present invention will be described below.

Figure 1:
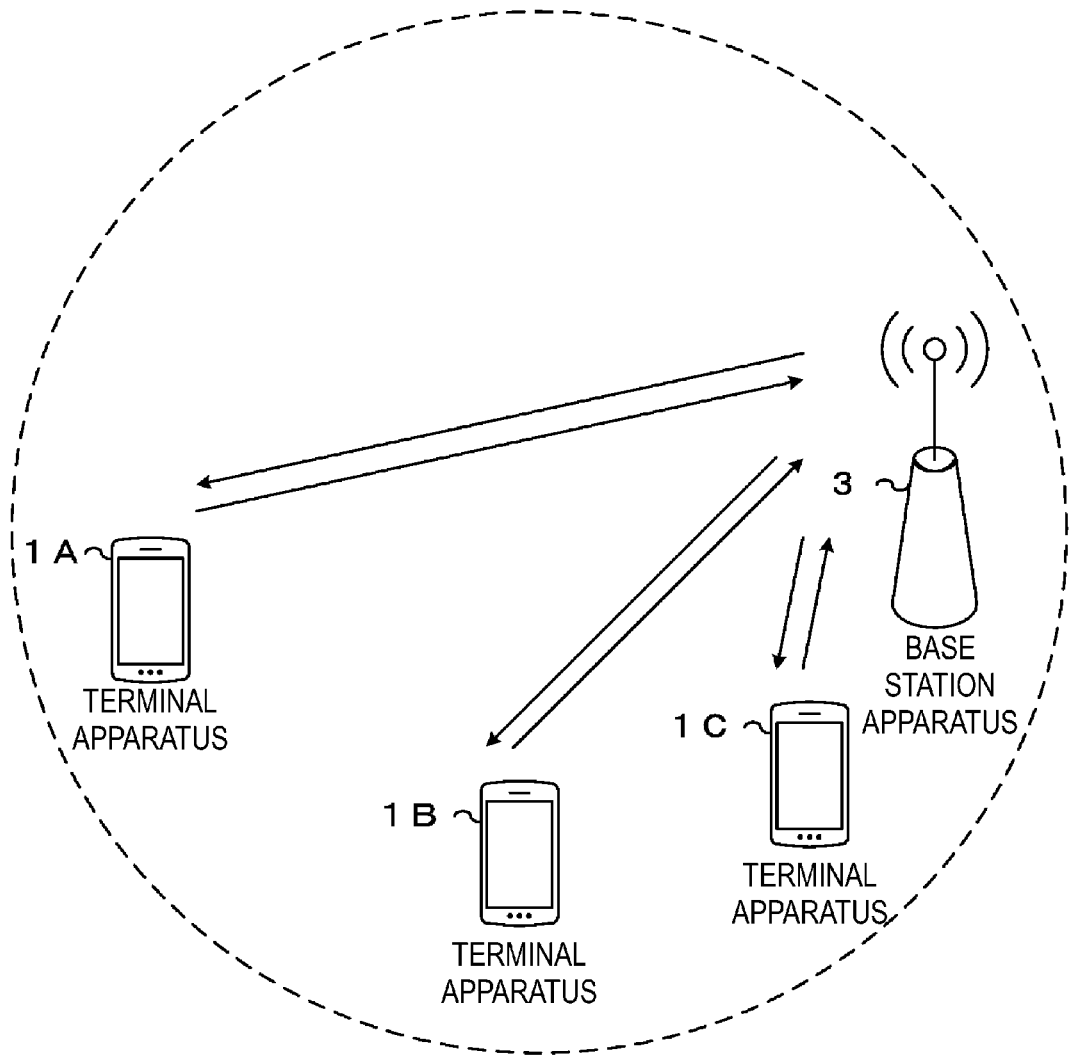
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Each of the terminal apparatuses 1A to 1C is referred to as a terminal apparatus 1 below. Time Division Duplex (TDD) and/or Frequency Division Duplex (FDD) is applied to a radio communication system in the present embodiment.

Now, carrier aggregation will be described.

In the present embodiment, multiple serving cells are configured for the terminal apparatus 1. A technology in which the terminal apparatus 1 communicates via the multiple serving cells is referred to as cell aggregation or carrier aggregation. The present invention may be applied to each of the multiple serving cells configured for the terminal apparatus 1. Furthermore, the present invention may be applied to some of the configured multiple serving cells. Furthermore, the present invention may be applied to each of groups of the configured multiple serving cells. Furthermore, the present invention may be applied to some of the groups of the configured multiple serving cells.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) of the multiple serving cells (component carriers).

Physical channels and physical signals according to the present embodiment will be described.

In FIG. 1, the following uplink physical channels are used for uplink radio communication from the terminal apparatus 1 to the base station apparatus 3. The uplink physical channels are used for transmission of information output from higher layers.

Physical Uplink Control Channel (PUCCH)
Physical Uplink Shared Channel (PUSCH)

The PUCCH is used for transmission of Uplink Control Information (UCI). In the present embodiment, the terminal apparatus 1 may perform PUCCH transmission only in the primary cell.

The PUSCH is used for transmitting uplink data (Transport block, Medium Access Control Protocol Data Unit: MAC PDU, Uplink-Shared Channel: UL-SCH). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information. The present embodiment may be applied to a case in which two transport blocks are transmitted in a PUSCH that transmits a HARQ-ACK. The present embodiment may be applied to a case in which one transport block is transmitted in a PUSCH that transmits a HARQ-ACK.

The uplink control information includes: downlink channel state information (CSI); a scheduling request (SR) indicating a request for a PUSCH resource; and a hybrid automatic repeat request acknowledgement (HARQ-ACK) for downlink data (a transport block, a medium access control protocol data unit (MAC PDU), a downlink-shared channel (DL-SCH), or a physical downlink shared channel (PDSCH)). The HARQ-ACK indicates an acknowledgement (ACK) or a negative-acknowledgement (NACK). HARQ-ACK is also referred to as ACK/NACK, HARQ feedback, HARQ-ACK feedback, HARQ response, HARQ-ACK response, HARQ information, HARQ-ACK information, HARQ control information, and HARQ-ACK control information.

In a case that the number of HARQ-ACK bits transmitted via one PUCCH or one PUSCH is larger than $X_1$, L-bit Cyclic Redundancy Check (CRC) parity bits are added to the HARQ-ACK bits. In a case that the number of HARQ-ACK bits transmitted via one PUCCH or one PUSCH is the same as $X_1$, or smaller than $X_1$, no Cyclic Redundancy Check (CRC) parity bit is added to the HARQ-ACK bits. Here, $X_1$ may be 22. Here, L may be 8. The CRC parity bits are calculated based on the HARQ-ACK bits.

In FIG. 1, the following downlink physical channels are used for downlink radio communication from the base station apparatus 3 to the terminal apparatus 1. The downlink physical channels are used for transmission of information output from higher layers.

Physical Downlink Control Channel (PDCCH)
Physical Downlink Shared Channel (PDSCH)

The PDCCH is used for transmission of Downlink Control Information (DCI). The Downlink Control Information is also referred to as a DCI format. The Downlink Control Information includes a downlink grant and an uplink grant. The downlink grant is also referred to as downlink assignment or downlink allocation.

The downlink grant is used for scheduling of a single PDSCH within a single cell. The downlink grant is used for scheduling of the PDSCH within a subframe identical to the subframe in which the downlink grant is transmitted.

The uplink grant is used for scheduling of a single PUSCH within a single cell. The uplink grant is used for scheduling of a single PUSCH in the fourth or later subframe after the subframe in which the uplink grant is transmitted. The uplink grant includes a TPC command for the PUSCH.

The PDSCH is used for transmission of downlink data (Downlink Shared Channel (DL-SCH)).

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing and coding processing are performed for each codeword. One codeword is mapped to one or more layers.

A configuration of the radio frame according to the present embodiment will be described below.

Figure 2:
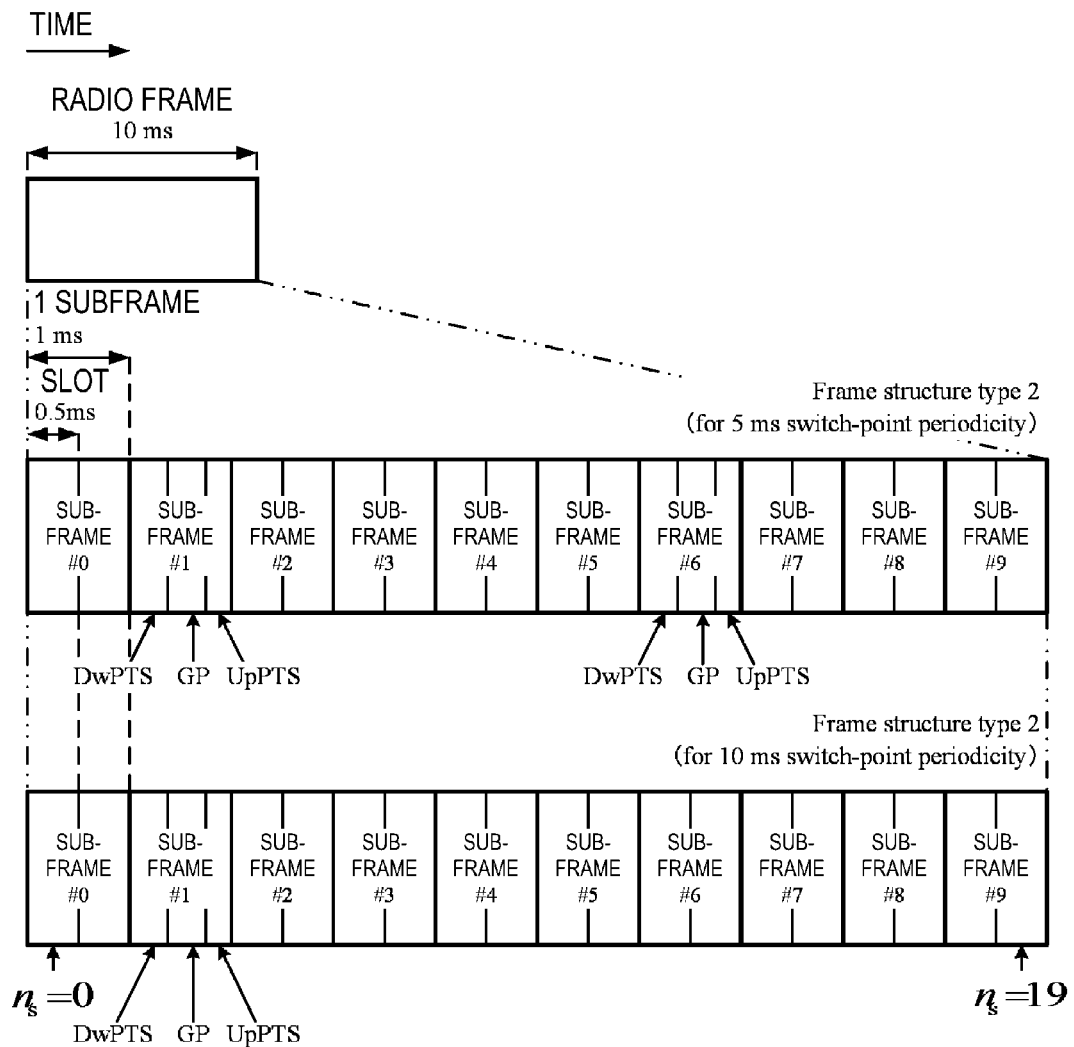
FIG. 2 is a diagram illustrating a schematic configuration of a radio frame according to the present embodiment.

FIG. 2 is a diagram illustrating a schematic configuration of a radio frame according to the present embodiment. Each of the radio frames is 10 ms in length. In FIG. 2, the horizontal axis is a time axis. Furthermore, each of the radio frames is constituted of two half frames. Each of the half frames is 5 ms in length. Each of the half frames is constituted of five subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. That is, 10 subframes can be used at each interval of 10 ms.

Hereinafter, the timing of HARQ-ACK transmission in an uplink will be described.

The terminal apparatus 1 may transmit a HARQ-ACK in one uplink subframe n based on the detection of at least one of a plurality of PDSCH transmissions in at least one of a plurality of subframes in at least one of a plurality of serving cells.

Hereinafter, the device configuration of the terminal apparatus 1 of the present invention will be described.

Figure 3:
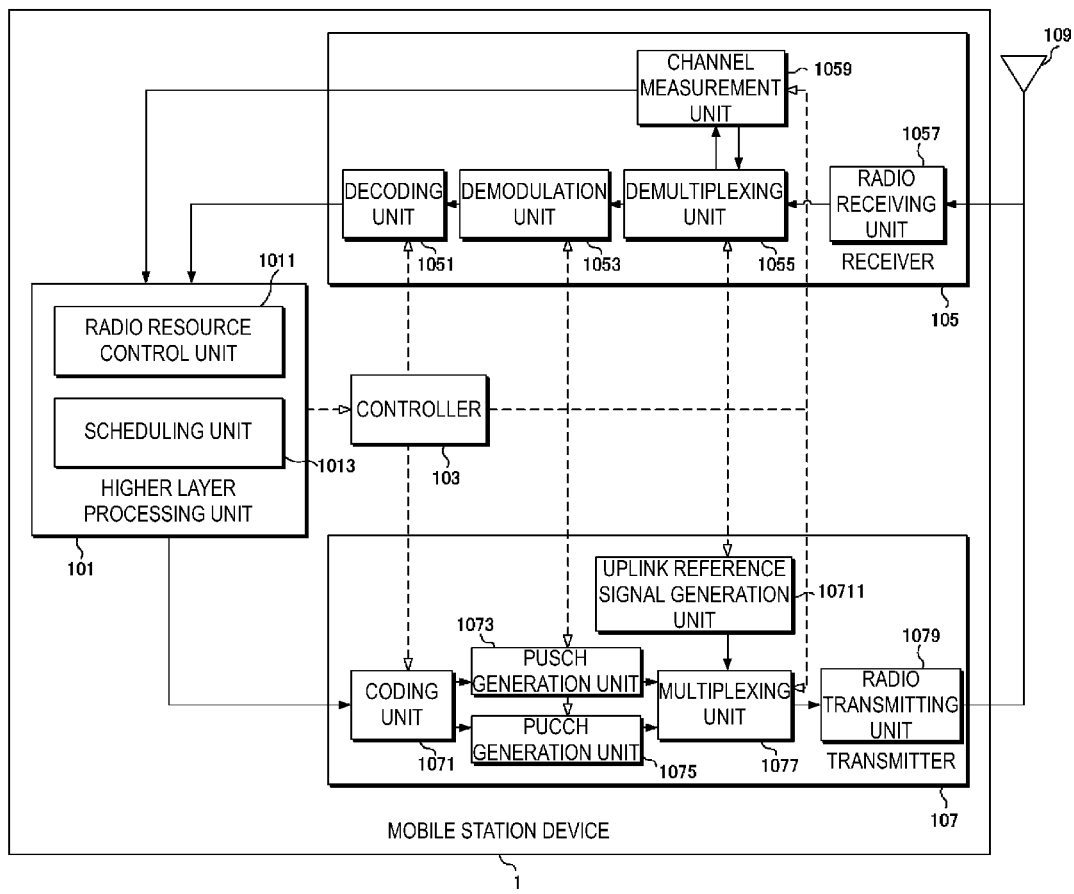
FIG. 3 is a schematic block diagram illustrating a configuration of a terminal apparatus 1 according to the present invention.

FIG. 3 is a schematic block diagram illustrating a configuration of a terminal apparatus 1 according to the present invention.

As illustrated in the Figures, the terminal apparatus 1 is configured to include a higher layer processing unit 101, a controller 103, a receiver 105, a transmitter 107, and a transmit and/or receive antenna 109. The higher layer processing unit 101 is configured to include a radio resource control unit 1011 and a scheduling unit 1013. The receiver 105 is configured to include a decoding unit 1051, a demodulation unit 1053, a demultiplexing unit 1055, a radio receiving unit 1057, and a channel measurement unit 1059. The transmitter 107 is configured to include a coding unit 1071, a PUSCH generation unit 1073, a PUCCH generation unit 1075, a multiplexing unit 1077, a radio transmitting unit 1079, and an uplink reference signal generation unit 10711.

The higher layer processing unit 101 outputs the uplink data generated by a user operation or the like to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. In addition, the higher layer processing unit 101 generates control information for control of the receiver 105 and the transmitter 107 based on downlink control information and the like received on the PDCCH, and outputs the control information to the controller 103.

The radio resource control unit 1011 included in the higher layer processing unit 101 manages various types of configuration information of the terminal apparatus 1 itself. For example, the radio resource control unit 1011 manages the configured serving cell. Furthermore, the radio resource control unit 1011 generates information to be mapped to each channel of uplink, and outputs the generated information to the transmitter 107. In a case that the received downlink data is successfully decoded, the radio resource control unit 1011 generates an ACK and outputs the ACK to the transmitter 107. In a case that decoding of the received downlink data fails, the radio resource control unit 1011 generates a NACK and outputs the NACK to the transmitter 107.

The scheduling unit 1013 included in the higher layer processing unit 101 stores the downlink control information received via the receiver 105. The scheduling unit 1013 controls the transmitter 107 via the controller 103 to transmit, in a fourth subframe after the subframe that has received the uplink grant, the PUSCH according to the received uplink grant. The scheduling unit 1013 controls the receiver 105 via the controller 103 to receive, in the subframe that has received the downlink grant, the PDSCH according to the received downlink grant.

In accordance with the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and/or receive antenna 109, and outputs the resulting information to the higher layer processing unit 101.

The radio receiving unit 1057 orthogonally demodulates the downlink signal received through the transmit and/or receive antenna 109 and converts the orthogonally demodulated analog signal into a digital signal. The radio receiving unit 1057 performs fast Fourier Transform (FFT) of the digital signal and extracts a signal in the frequency domain.

The demultiplexing unit 1055 separates the extracted signal into a PDCCH, a PDSCH, and a downlink reference signal, respectively. The demultiplexing unit 1055 outputs the separated downlink reference signal to the channel measurement unit 1059.

The demodulation unit 1053 performs demodulation corresponding to a modulation scheme such as QPSK, 16 Quadrature Amplitude Modulation (QAM), 64 QAM, or the like with respect to the PDCCH and the PDSCH, and outputs a result of the demodulation to the decoding unit 1051.

The decoding unit 1051 decodes the downlink data, and outputs the decoded downlink data to the higher layer processing unit 101. The channel measurement unit 1059 calculates a downlink propagation path estimate value from the downlink reference signal, and outputs the downlink propagation path estimate value to the demultiplexing unit 1055.

In accordance with the control signal input from the controller 103, the transmitter 107 generates an uplink reference signal, codes and modulates the uplink data and uplink control information input from the higher layer processing unit 101, multiplexes the PUCCH, the PUSCH, and the generated uplink reference signal, and transmits a result of the multiplexing to the base station apparatus 3 via the transmit and/or receive antenna 109.

The coding unit 1071 codes the uplink control information and the uplink data input from the higher layer processing unit 101, and outputs the coded bits to the PUSCH generation unit and/or the PUCCH generation unit.

The PUSCH generation unit 1073 modulates the coded bits $h_i$ input from the coding unit 1071, generates a modulation symbol, generates a PUSCH signal by performing DFT of the modulation symbol, and outputs the signal of the PUSCH that has undergone the DFT to the multiplexing unit 1077.

The PUCCH generation unit 1075 generates a PUCCH signal from the coded bits $q_i$ of the concatenated HARQ-ACK input from the coded bit concatenation unit 1071f, and outputs the generated PUCCH signal to the multiplexing unit 1077.

The uplink reference signal generation unit 10711 generates an uplink reference signal and outputs the generated uplink reference signal to the multiplexing unit 1077.

In accordance with the control signal input from the controller 103, the multiplexing unit 1075 multiplexes the PUSCH signal input from the PUSCH generation unit and/or the PUCCH signal input from the PUCCH generation unit and/or the uplink reference signal input from the uplink reference signal generation unit 10711 with uplink resource elements for each transmission antenna port.

The radio transmitting unit 1077 performs Inverse Fast Fourier Transform (IFFT) of the multiplexed signal, performs modulation in compliance with an SC-FDMA scheme, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Hereinafter, the device configuration of the base station apparatus 3 of the present invention will be described.

Figure 4:
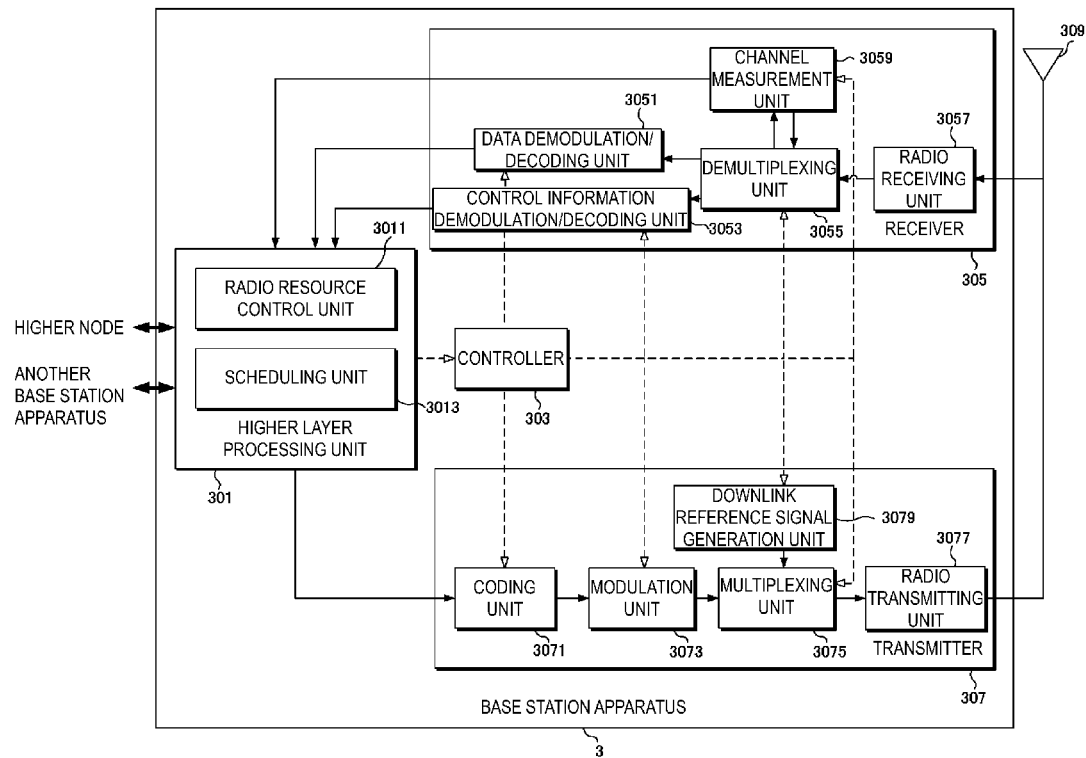
FIG. 4 is a schematic block diagram illustrating a configuration of a base station apparatus 3 according to the present invention.

FIG. 4 is a schematic block diagram illustrating a configuration of a base station apparatus 3 according to the present invention. As illustrated in the Figures, the base station apparatus 3 is configured to include a higher layer processing unit 301, a controller 303, a receiver 305, a transmitter 307, and a transmit and/or receive antenna 309. In addition, the higher layer processing unit 301 is configured to include a radio resource control unit 3011 and a scheduling unit 3013. In addition, the receiver 305 is configured to include a data demodulation/decoding unit 3051, a control information demodulation/decoding unit 3053, a demultiplexing unit 3055, a radio receiving unit 3057, and a channel measurement unit 3059. The transmitter 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data, an RRC signal, and a MAC Control Element (CE) that are to be allocated to the downlink PDSCH, and outputs a result of the generation or the acquirement to the HARQ control unit 3013. In addition, the radio resource control unit 3011 manages various types of configuration information for each mobile station device 1. For example, the radio resource control unit 3011 performs management of serving cells configured in the mobile station device 1, and the like.

The scheduling unit 3013 included in the higher layer processing unit 301 manages the radio resources of the PUSCH and PUCCH allocated to the mobile station device 1. In a case that radio resources of the PUSCH are allocated to the mobile station device 1, the scheduling unit 3013 generates an uplink grant for indicating the allocation of the radio resources of the PUSCH, and outputs the generated uplink grant to the transmitter 307.

Based on the control information from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the mobile station device 1 via the transmit and/or receive antenna 309, and outputs the decoded information to the higher layer processing unit 301.

The radio receiving unit 3057 orthogonally demodulates the uplink signal received via the transmit and/or receive antenna 309 and converts the orthogonally demodulated analog signal into a digital signal. The radio receiving unit 3057 performs fast Fourier Transform (FFT) of the digital signal, extracts a signal in the frequency domain, and outputs the signal in the frequency domain to the demultiplexing unit 3055.

The demultiplexing unit 1055 demultiplexes the signal input from the radio receiving unit 3057 into signals such as PUCCH, PUSCH, and the uplink reference signal. Moreover, the demultiplexing is performed based on radio resource allocation information that is determined in advance by the base station apparatus 3 using the radio resource control unit 3011 and that is included in the uplink grant notified to each of the mobile station devices 1. The demultiplexing unit 3055 performs a compensation of channel for the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demultiplexing unit 3055 acquires the modulation symbol of the uplink data and the modulation symbol of the uplink control information (HARQ-ACK) from the PUCCH and PUSCH signals resulting from the demultiplexing. The demultiplexing unit 3055 outputs the modulation symbol of the uplink data acquired from the PUSCH signal to the data demodulation/decoding unit 3051. The demultiplexing unit 3055 outputs the modulation symbol of the uplink control information (HARQ-ACK) acquired from the signal of the PUCCH or the signal of the PUSCH to the control information demodulation/decoding unit 3053.

The channel measurement unit 3059 measures the channel estimate, the channel quality, and the like based on the uplink reference signal input from the demultiplexing unit 3055, and outputs a result of the measurement to the demultiplexing unit 3055 and the higher layer processing unit 301.

The data demodulation/decoding unit 3051 decodes the uplink data from the modulation symbol of the uplink data input from the demultiplexing unit 3055. The data demodulation/decoding unit 3051 outputs the decoded uplink data to the higher layer processing unit 301.

The control information demodulation/decoding unit 3053 decodes the HARQ-ACK from the HARQ-ACK modulation symbol input from the demultiplexing unit 3055. The control information demodulation/decoding unit 3053 outputs the decoded HARQ-ACK to the higher layer processing unit 301.

In accordance with the control signal input from the controller 303, the transmitter 307 generates a downlink reference signal, codes and modulates the downlink control information and the downlink data that are input from the higher layer processing unit 301, multiplexes the PDCCH, the PDSCH, and the downlink reference signal, and transmits a result of the multiplexing to the mobile station device 1 via the transmit and/or receive antenna 309.

The coding unit 3071 performs coding on the downlink control information and the downlink data that are input from the higher layer processing unit 301. The modulation unit 3073 modulates the coded bits input from the coding unit 3071, in compliance with the modulation scheme such as BPSK, QPSK, 16 QAM, and 64 QAM.

The downlink reference signal generation unit 3079 generates the downlink reference signal. The multiplexing unit 3075 multiplexes the modulation symbol of each channel and the downlink reference signal.

The radio transmitting unit 3077 performs Inverse Fast Fourier Transform (IFFT) of the multiplexed modulation symbol or the like, performs modulation in compliance with an OFDM scheme, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 309 for transmission.

Figure 5:
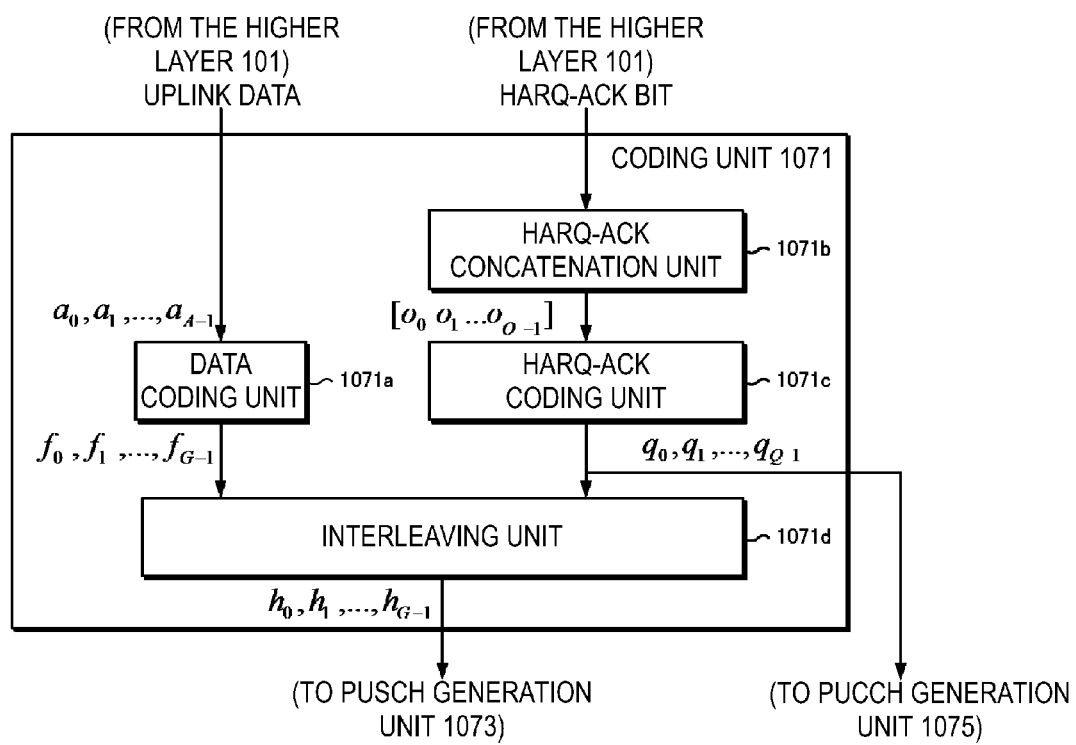
FIG. 5 is a schematic block diagram illustrating a configuration of a coding unit 1071 according to the present invention.

FIG. 5 is a schematic block diagram illustrating a configuration of a coding unit 1071 according to the present invention. The coding unit 1071 includes a data coding unit 1071a, a HARQ-ACK concatenation unit 1071b, a HARQ-ACK coding unit 1071c, and an interleaving unit 1071d.

The data coding unit 1071a adds the CRC parity bits generated from the uplink data to the uplink data $a_i$ input from the higher layer processing unit 101, applies error correcting coding to the uplink data to which the CRC parity bits have been added, and outputs the coded bits $f_i$ of the uplink data to the interleaving unit 1071d. A is the payload size (number of bits) of the uplink data. G is the number of coded bits of the uplink data. The data coding unit 1071a codes each of a plurality of pieces of uplink data.

The HARQ-ACK concatenation unit 1071b concatenates HARQ-ACK bits, for PDSCH transmission in at least one of a plurality of subframes in at least one of a plurality of serving cells, that are input from the higher layer processing unit 101, and outputs the concatenated HARQ-ACK bits (a sequence of HARQ-ACK bits) $[o_0 o_1 \ldots o_{o-1}]$ to the HARQ-ACK coding unit 1071c. O indicates the number of HARQ-ACK bits input from the higher layer processing unit 101. That is, O indicates the number of HARQ-ACK bits transmitted on one PUSCH or on one PUCCH in one subframe.

The HARQ-ACK coding unit 1071c codes the concatenated HARQ-ACK bits $[o_0 o_1 \ldots o_{o-1}]$. In a case that the HARQ-ACK is transmitted using a PUSCH, the HARQ-ACK coding unit 1071c outputs the coded bits $q_i$ of the HARQ-ACK to the interleaving unit 1071d. In a case that the HARQ-ACK is transmitted using a PUCCH, the HARQ-ACK coding unit 1071c outputs the coded bits $q_i$ of the HARQ-ACK to the PUCCH generation unit 1075.

Figure 6:
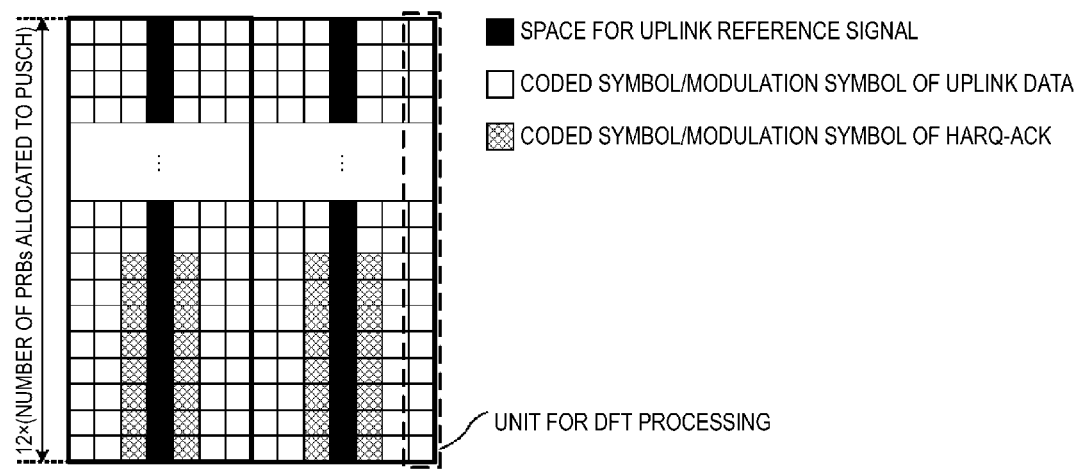
FIG. 6 is a diagram illustrating an example of a method for interleaving coded modulation symbols according to the present embodiment.

The interleaving unit 1071g concatenates and interleaves the coded bits of the uplink data $f_i$ and the coded bits $q_i$ of the HARQ-ACK, and outputs the concatenated coded bits $h_i$ to the PUSCH generation unit 1073. FIG. 6 is a diagram illustrating an example of a method for interleaving coded modulation symbols according to the present embodiment. A coded modulation symbol comprises a group of coded bits. One modulation symbol is generated by modulating one coded symbol. One coded modulation symbol includes the same number of coded bits as the modulation order $Q_m$ of the modulation scheme for the uplink data.

In FIG. 6, there are as many columns as the SC-FDMA symbols in a subframe. However, since the fourth and eleventh columns are the spaces for the uplink reference signal (DMRS), no coded modulation symbols are allocated. In FIG. 6, there are as many rows as the subcarriers of the PUSCH whose allocation is indicated by the uplink grant.

In the PUSCH signal generation unit 1073, the plurality of modulation symbols corresponding to the coded modulation symbols arranged in the same column of FIG. 6 are, as a whole, processed by Discrete Fourier Transform (DFT), and the signal that has undergone DFT is mapped to the resource element of the PUSCH whose radio resource allocation is indicated by the uplink grant. The signal, generated from the coded symbol in the i-th column, that has undergone DFT is mapped to the resource element corresponding to the i-th SC-FDMA symbol in the subframe.

The interleaving unit 1071 g concatenates and interleaves the coded modulation symbol $f_i$ of the uplink data and the coded modulation symbol $q_i$ of the HARQ-ACK as illustrated in FIG. 6. The HARQ-ACK coded modulation symbols are allocated to the third, fifth, tenth, and twelfth columns.

Figure 7:
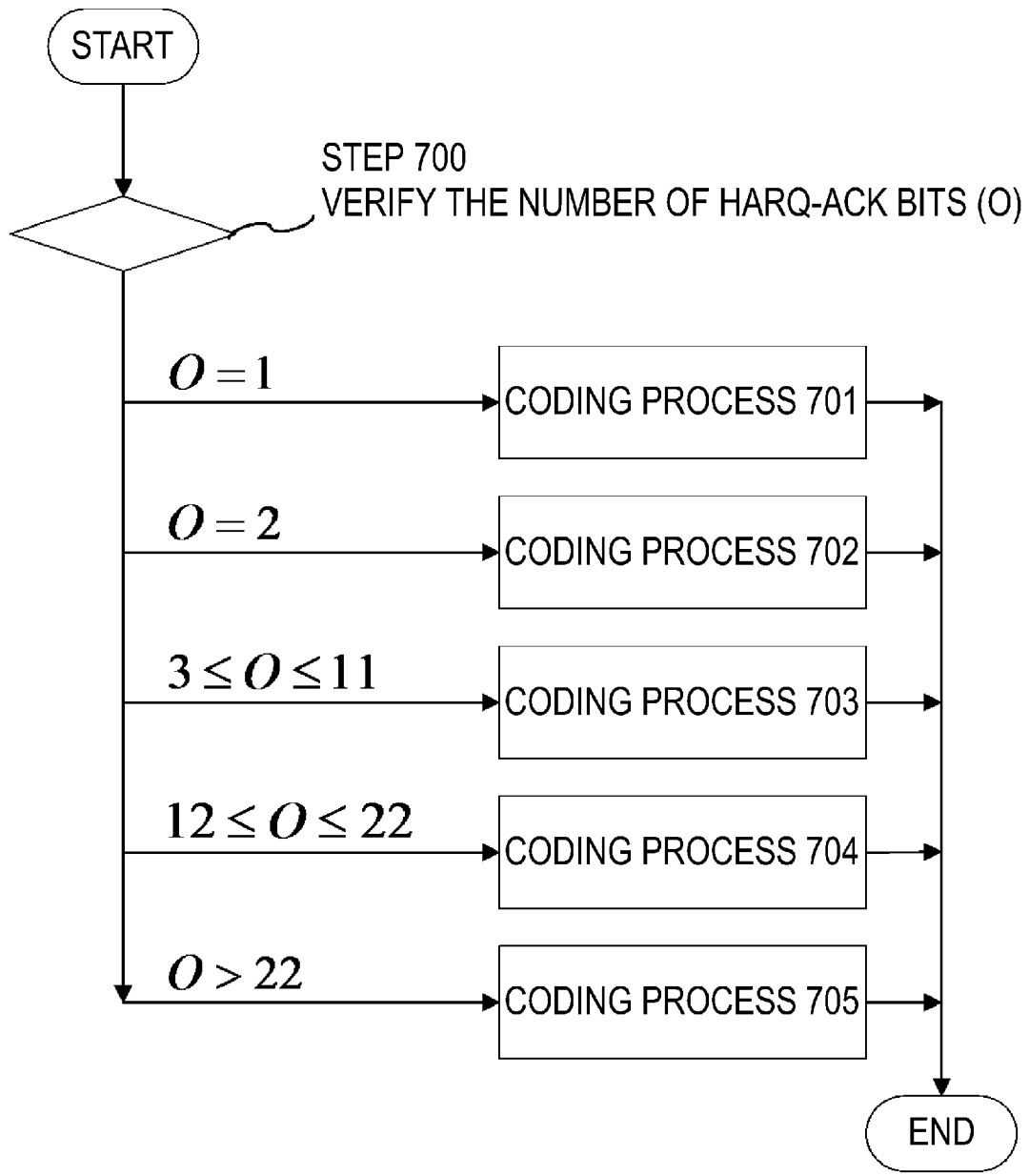
FIG. 7 is a diagram illustrating an example of a method for determining a HARQ-ACK coding process according to the present embodiment.

FIG. 7 is a diagram illustrating an example of a method for determining a HARQ-ACK coding process according to the present embodiment.

In Step 700, the terminal apparatus 1 verifies the number O of HARQ-ACK bits transmitted on one PUSCH. In a case that the number O of HARQ-ACK bits is 1, the terminal apparatus 1 applies the coding process 701 to the HARQ-ACK. In a case that the number O of HARQ-ACK bits is 2, the terminal apparatus 1 applies the coding process 702 to the HARQ-ACK. In a case that the number O of HARQ-ACK bits is greater than 2 and less than 12, the terminal apparatus 1 applies the coding process 703 to the HARQ-ACK. In a case that the number O of HARQ-ACK bits is greater than 11 and less than 23, the terminal apparatus 1 applies the coding process 704 to the HARQ-ACK. In a case that the number O of HARQ-ACK bits is greater than 22, the terminal apparatus 1 applies the coding process 705 with respect to the HARQ-ACK.

In the coding process 701, 1-bit HARQ-ACK [$o_0$] is coded based on FIG. 8. In the coding process 702, 2-bit HARQ-ACK [$o_0 o_1$] is coded based on FIG. 9. Here, x is a placeholder bit for scrambling the HARQ-ACK bits. The value of the placeholder bit is 1, and it is not scrambled by the scrambling sequence. Here, y is a repeat placeholder bit for scrambling the HARQ-ACK bits. The repeat placeholder bit is converted to the same value as the value of the immediately preceding bit. Here, the immediately preceding bit is the bit after being scrambled. Here, $o_2$ is given by Expression 1. Here, X mod Y is a function that returns the remainder obtained by dividing X by Y.

$$o_2 = (o_0 + o_1) \bmod 2 \quad \text{[Expression 1]}$$

In the coding process 703, the HARQ-ACK [$o_0 o_1 \ldots o_{o-1}$] is coded using block code. The codeword of the block code is a linear combination of 11 base sequences $M_{i,n}$. FIG. 10 is a diagram illustrating an example of a base sequence $M_{i,n}$ according to the present embodiment. In the coding process 703, the coded bits $q_i$ of the HARQ-ACK are given based on Expression 2.

$$q_i = \sum_{n=0}^{O-1} (o_n \cdot M_{i,n}) \bmod 2 \quad \text{[Expression 2]}$$

In the coding process 704, the HARQ-ACK [$o_0 o_1 \ldots o_{o-1}$] is divided into a first sequence [$o_0 o_1 \ldots o_{ceil(o/2)-1}$] and a second sequence [$o_{ceil(o/2)} o_{ceil(o/2)+1} \ldots o_{o-1}$], where ceil( ) is a function that returns the smallest integer larger than the input value. The first sequence is coded according to Expression 3. The second sequence is coded according to Expression 4. In the coding process 704, the coded bits $q_i$ of the HARQ-ACK are obtained by concatenation and circular repetition of the coded bits of the first sequence $q'_i$ and the coded bits of the second sequence $q''_i$.

$$q'_i = \sum_{n=0}^{ceil(O/2)-1} (o_n \cdot M_{i,n}) \bmod 2 \quad \text{[Expression 3]}$$

$$q''_i = \sum_{n=0}^{O-ceil(O/2)-1} (o_{ceil(O/2)+n} \cdot M_{i,n}) \bmod 2 \quad \text{[Expression 4]}$$

In the coding process 705, L-bit CRC parity bits are added to the HARQ-ACK [$o_0 o_1 \ldots o_{o-1}$]. Here, L may be 8. The CRC parity bits are calculated from the HARQ-ACK [$o_0 o_1 \ldots o_{o-1}$]. In the coding process 705, the HARQ-ACK coded bits $q_i$ are obtained by applying Tail Biting Convolutional Coding (TBCC) to a sequence obtained by adding the CRC parity bits to the HARQ-ACK [$o_0 o_1 \ldots o_{o-1}$].

The terminal apparatus 1 determines the number Q' of the coded modulation symbols of the HARQ-ACK for each layer. In the coding processes 701 to 705, the terminal apparatus 1 performs an adjustment (rate matching) such that the number Q of the coded bits $q_i$ of the HARQ-ACK is achieved. The number Q of the coded bits $q_i$ of the HARQ-ACK is the product of the number Q' of coded modulation symbols for each layer and the modulation order $Q_m$ for each layer (transport block).

In a case that the HARQ-ACK is multiplexed with the transport block in the PUSCH, the HARQ-ACK is multiplexed in all the layers of all the transport blocks of the PUSCH.

In a case that one transport block is transmitted using a PUSCH that transmits HARQ-ACK bits, the Q' for the HARQ-ACK is given by Expression 5.

[Expression 5]

$$Q' = \min\left[ \text{ceil}\left( \frac{(O+L) \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right), 4 \cdot M_{sc}^{PUSCH} \right]$$

where

O is the number of HARQ-ACK bits, and

L is the number of CRC parity bits given by $$L = \begin{cases} 0 & O \le 22 \\ 8 & \text{otherwise} \end{cases}, \text{ and}$$

$M_{sc}^{PUSCH}$ is the scheduled bandwidth for PUSCH transmission in the current subframe for the transport block, expressed as a number of subcarriers, and $N_{symb}^{PUSCH\text{-}initial}$ is the number of SC-FDMA symbols per subframe for initial PUSCH transmission for the same transport block, and $M_{sc}^{PUSCH\text{-}initial}$, C, and $K_r$ are obtained from the initital PDCCH for the same transport block, and -continued $$\beta_{offset}^{PUSCH} = \beta_{offset}^{HARQ-ACK}, \text{ where } \beta_{offset}^{HARQ-ACK} \text{ is determined}$$

depending on the number of transport blocks which are transmitted on the corresponding PUSCH.

In a case that two transport blocks are transmitted using a PUSCH that transmits HARQ-ACK bits, the Q' for the HARQ-ACK is given by Expression 6.

$$Q' = \max[\min(Q'_{temp}, 4 \cdot M_{sc}^{PUSCH}), Q'_{min}] \qquad \text{[Expression 6]}$$

$M_{sc}^{PUSCH}$ is the scheduled bandwidth for PUSCH transmission in current subframe for the transport block, expressed as a number of sucarriers.

The function max( ) is a function that returns the largest value among a plurality of input values. The function min( ) is a function that returns the smallest value among a plurality of input values. The function max( ) is also referred to as a max function. The function min( ) is also referred to as a min function. $Q'_{temp}$ of Expression 6 is given by Expression 7.

[Expression 7]

$$Q'_{temp} = \text{ceil}\left[\frac{(O+L) \cdot M_{sc}^{PUSCH \cdot initial(1)} \cdot N_{symb}^{PUSCH \cdot initial(1)} \cdot}{M_{sc}^{PUSCH \cdot initial(2)} \cdot N_{symb}^{PUSCH \cdot initial(2)} \cdot \beta_{offset}^{PUSCH}}{\sum_{r=0}^{C^{(1)}-1} K_r^{(1)} \cdot M_{sc}^{PUSCH \cdot initial(2)} \cdot N_{symb}^{PUSCH \cdot initial(2)} + \sum_{r=0}^{C^{(2)}-1} K_r^{(2)} \cdot M_{sc}^{PUSCH \cdot initial(1)} \cdot N_{symb}^{PUSCH \cdot initial(1)}}\right]$$

where

O is the number of HARQ-ACK bits, and

L is the number of CRC parity bits given by $$L = \begin{cases} 0 & O \leq 22 \\ 8 & \text{otherwise} \end{cases}, \text{ and}$$

$M_{sc}^{PUSCH \cdot initial(x)}$, $x = \{1, 2\}$ are the scheduled bandwidth for PUSCH transmission in the initial subframe for the first and second transport block, respectively, expressed as a number of subcarriers, and $N_{symb}^{PUSCH \cdot initial(x)}$, $x = \{1, 2\}$ are the number of SC-FDMA symbols per subframe for initial PUSCH transmission for the first and second transport block, where $M^{PUSCH \cdot initial(x)}$, $x = \{1, 2\}$, $C^{(x)}$, $x = \{1, 2\}$, and $K_r^{(x)}$, $x = \{1, 2\}$ are obtained from the intital PDCCH for the corresponding transport block, and $$\beta_{offset}^{PUSCH} = \beta_{offset}^{HARQ-ACK}, \text{ where } \beta_{offset}^{HARQ-ACK} \text{ is determined}$$

depending on the number of transport blocks which are transmitted on the corresponding PUSCH.

Figure 11:
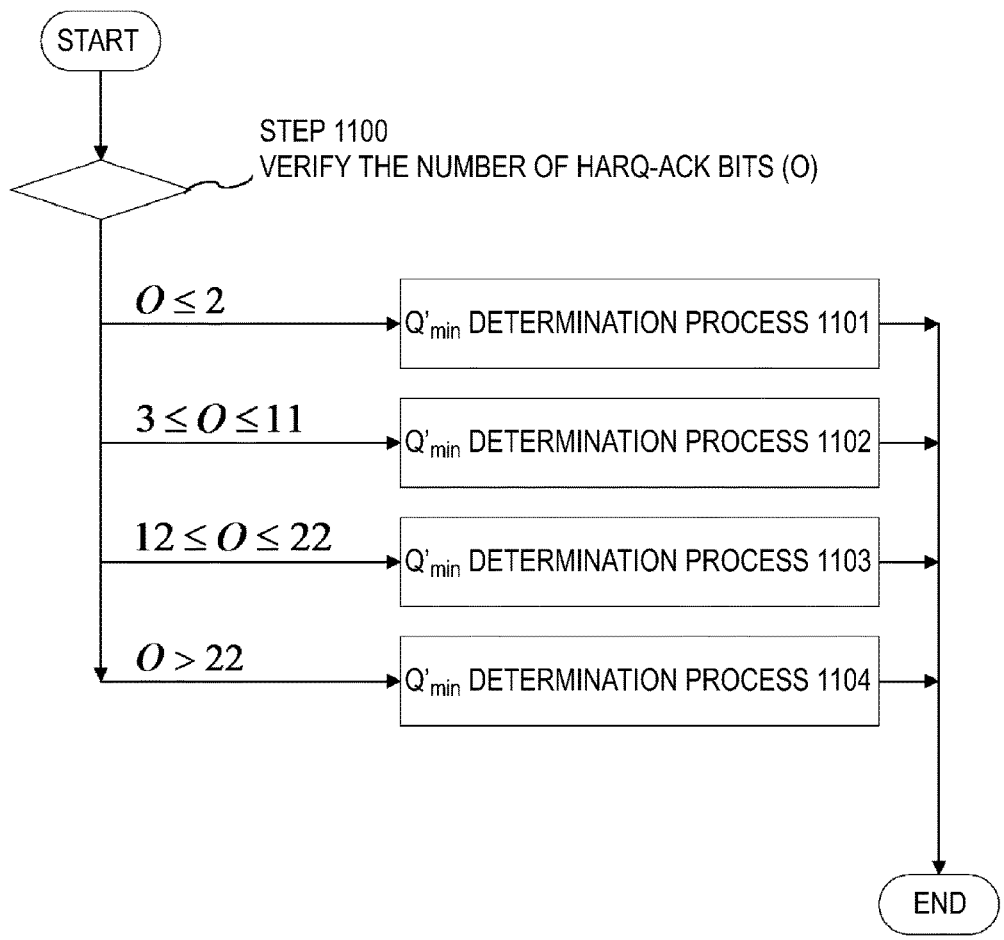
FIG. 11 is a diagram illustrating an example of a method for determining a $Q'_{min}$ determination process according to the present embodiment.

$Q'_{min}$ in Expression 6 is given based on at least the number O of HARQ-ACK bits. FIG. 11 is a diagram illustrating an example of a method for determining a $Q'_{min}$ determination process according to the present embodiment.

In Step 1100, the terminal apparatus 1 verifies the number O of HARQ-ACK bits transmitted on one PUSCH. In a case that the number O of HARQ-ACK bits is less than 3, the terminal apparatus 1 applies the determination process 1101 to $Q'_{min}$. In a case that the number O of HARQ-ACK bits is greater than 2 and less than 12, the terminal apparatus 1 applies the determination process 1102 to $Q'_{min}$. In a case that the number O of HARQ-ACK bits is greater than 11 and less than 23, the terminal apparatus 1 applies the determination process 1103 to $Q'_{min}$. In a case that the number O of HARQ-ACK bits is greater than 22, the terminal apparatus 1 applies the determination process 1104 to $Q'_{min}$.

In determination process 1101, the terminal apparatus 1 may determine $Q'_{min}$ according to Expression 8.

$$Q'_{min} = O \qquad \text{[Expression 8]}$$

In determination process 1102 and determination process 1104, the terminal apparatus 1 may determine $Q'_{min}$ according to Expression 9 or Expression 10. In determination process 1102, $Q'_{min}$ may be determined according to Expression 9, and in determination process 1104, $Q'_{min}$ may be determined according to Expression 10.

$$Q'_{min} = \text{ceil}(2O/Q'_m) \qquad \text{[Expression 9]}$$

$$Q'_{min} = \text{ceil}[2 \cdot (O+L)/Q'_m] \qquad \text{[Expression 10]}$$

In determination process 1103, the terminal apparatus 1 may determine $Q'_{min}$ according to Expression 11.

$$Q'_{min} = \text{ceil}(2O_1/Q'_m) + \text{ceil}(2O_2/Q'_m) \qquad \text{[Expression 11]}$$

$Q'_m$ is given by Expression 12. $O_1$ is given by Expression 13. $O_2$ is given by Expression 14.

$$Q'_m = \min(Q_m^1, Q_m^2) \qquad \text{[Expression 12]}$$

where $Q_m^x$, $x = \{1, 2\}$ is the modulation order of transport block "x".

$$O_1 = \text{ceil}(O/2) \qquad \text{[Expression 13]}$$

$$O_2 = O - \text{ceil}(O/2) \qquad \text{[Expression 14]}$$

In this way, the number Q of the coded bits $q_i$ of the HARQ-ACK is efficiently controlled.

For example, in a case that the scheduled bandwidth for PUSCH transmission is 12 subcarriers, the number of coded modulation symbols available for the HARQ-ACK is 48. In contrast, in Expression 9 or Expression 14, in a case that $Q'_m$ is 2 and O is 100, then $Q'_{min}$ is 100 or 108. That is, the number Q' of coded modulation symbols for each layer may exceed the number of coded modulation symbols available for the HARQ-ACK. Accordingly, in determination process 1103, the terminal apparatus 1 may determine $Q'_{min}$ according to Expression 15 or Expression 16.

$$Q'_{min} = \min[\text{ceil}(2 \cdot O/Q'_m), 4 \cdot M_{sc}^{PUSCH}] \qquad \text{[Expression 15]}$$

$$Q'_{min} = \min[\text{ceil}\{2 \cdot (O+L)/Q'_m\}, 4 \cdot M_{sc}^{PUSCH}] \qquad \text{[Expression 16]}$$

Alternatively, the terminal apparatus 1 may determine Q' according to Expression 17 instead of Expression 6. Comparing Expression 6 with Expression 7, the order of applying the min function and the max function differs. In Expression 6, the output of the min function to which $Q'_{temp}$ and $4 \cdot M^{PUSCH}_{sc}$ are input, and $Q'_{min}$, are input to the max function. In contrast, in Expression 17, the output of the max function to which $Q'_{temp}$ and $Q'_{min}$ are input, and $4 \cdot M^{PUSC}_{sc}$, are input to the min function.

$$Q' = \min[\max(Q'_{temp}, Q'_{min}), 4 \cdot M_{sc}^{PUSCH}] \qquad \text{[Expression 17]}$$

In this way, the number Q' of coded modulation symbols for each layer does not exceed the number of coded modulation symbols available for the HARQ-ACK.

Various aspects of the terminal apparatus 1 and the base station apparatus 3 according to the present embodiment will be described below.

(1) A first aspect of the present embodiment relates to a terminal apparatus 1, the terminal apparatus 1 including: a transmitter 107 configured to transmit a HARQ-ACK using a PUSCH that includes a transport block; and a coding unit 1071 configured to code the HARQ-ACK, wherein a number Q' of coded modulation symbols of the HARQ-ACK is (i) an output of a max function to which $Q'_{temp}$ and $Q'_{min}$ are input, and (ii) an output of a min function to which $4 \cdot M^{PUSCH}_{sc}$ is input, the $M^{PUSCH}_{sc}$ is a scheduled bandwidth for transmission of the PUSCH in a subframe for the transport block, and is represented by a number of subcarriers, the max function is a function configured to output a largest value among a plurality of input values, and the min function is a function configured to output a smallest value among a plurality of input values.

(2) A second aspect of the present embodiment relates to a base station apparatus 3, the base station apparatus 3 including: a receiver 305 configured to receive a HARQ-ACK using a PUSCH that includes a transport block; and a decoding unit 3053 configured to decode the HARQ-ACK, wherein a number Q' of coded modulation symbols of the HARQ-ACK is (i) an output of a max function to which $Q'_{temp}$ and $Q'_{min}$ are input, and (ii) an output of a min function to which $4 \cdot M^{PUSCH}_{sc}$ is input, the $M^{PUSCH}_{sc}$ is a scheduled bandwidth for transmission of the PUSCH in a subframe for the transport block, and is represented by a number of subcarriers, the max function is a function configured to output a largest value among a plurality of input values, and the min function is a function configured to output a smallest value among a plurality of input values.

In this way, the terminal apparatus can efficiently transmit the HARQ-ACK. In addition, the base station apparatus can efficiently receive the HARQ-ACK.

A program running on each of the base station apparatus 3 and the terminal apparatus 1 according to the present invention may serve as a program that controls a Central Processing Unit (CPU) and the like (a program for causing a computer to operate) in such a manner as to enable the functionalities according to the above-described embodiment of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal apparatus 1 and the base station apparatus 3 according to the above-described embodiment may be partially implemented by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station apparatus 3 according to the above-described embodiment is implemented as an aggregation (a device group) constituted of multiple devices. Each of the devices constituting such a device group may include some or all portions of each function or each functional block of the base station apparatus 3 according to the above-described embodiment. The device group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be achieved as an LSI which is a typical integrated circuit or may be achieved as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication device, but the present invention is not limited to such a terminal apparatus, and is applicable to a terminal apparatus or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention.

Furthermore, a configuration in which a constituent element that achieves the same effect is substituted for the one that is described in the embodiments is also included in the technical scope of the present invention.

CROSS-REFERENCE OF RELATED APPLICATION

This application claims the benefit of priority to JP 2016-080159 filed on Apr. 13, 2016, which is incorporated herein by reference in its entirety.

REFERENCE SIGNS LIST 1 (1A, 1B, 1C) Terminal apparatus
3 Base station apparatus
101 Higher layer processing unit
103 Controller
105 Receiver
107 Transmitter
301 Higher layer processing unit
303 Controller
305 Receiver
307 Transmitter
1011 Radio resource control unit
1013 Scheduling unit
3011 Radio resource control unit
3013 Scheduling unit

The invention claimed is:

1. A terminal apparatus comprising:
a transmitter configured to transmit a HARQ-ACK by using a PUSCH that includes a transport block; and
a coding unit configured to code the HARQ-ACK, wherein
a number Q' of coded modulation symbols of the HARQ-ACK is given by min [max ($Q'_{temp}$, $Q'_{min}$), $4 \cdot M^{PUSCH}{sc}$],
the $M^{PUSCH}{sc}$ is a scheduled bandwidth for transmission of the PUSCH in a subframe for the transport block, and is represented by a number of subcarriers,
the max ( ) is a function configured to output a largest value among a plurality of input values, and
the min [ ] is a function configured to output a smallest value among a plurality of input values.

2. The terminal apparatus according to claim 1, wherein:
the $Q'_{min}$ is based on a number O of bits of the HARQ-ACK and a number L of CRC parity bits, and
the $Q'_{temp}$ is based on at least the number O of bits of the HARQ-ACK, the number L of CRC parity bits, and a number $N^{PUSCH\text{-}initial(x)}{sc}$ of SC-FDMA symbols for a second PUSCH for an initial transmission of the transport block.

3. A base station apparatus comprising:
a receiver configured to receive a HARQ-ACK by using a PUSCH that includes a transport block; and
a decoding unit configured to decode the HARQ-ACK, wherein
a number Q' of coded modulation symbols of the HARQ-ACK is given by min [max ($Q'_{temp}$, $Q'_{min}$), $4 \cdot M^{PUSCH}{sc}$],
the $M^{PUSCH}{sc}$ is a scheduled bandwidth for transmission of the PUSCH in a subframe for the transport block, and is represented by a number of subcarriers,
the max ( ) is a function configured to output a largest value among a plurality of input values, and
the min [ ] is a function configured to output a smallest value among a plurality of input values.

4. The station apparatus according to claim 3, wherein:
the $Q'_{min}$ is based on a number of bits of the HARQ-ACK and a number of CRC parity bits, and
the $Q'_{temp}$ is based on at least the number of bits of the HARQ-ACK, the number of CRC parity bits, and a number of SC-FDMA symbols for a second PUSCH for an initial transmission of the transport block.

5. A communication method for use by a terminal apparatus, the communication method comprising:
transmitting a HARQ-ACK by using a PUSCH that includes a transport block; and
coding the HARQ-ACK, wherein
a number Q' of coded modulation symbols of the HARQ-ACK is given by min [max ($Q'_{temp}$, $Q'_{min}$), $4 \cdot M^{PUSCH}{sc}$],
the $M^{PUSCH}{sc}$ is a scheduled bandwidth for transmission of the PUSCH in a subframe for the transport block, and is represented by a number of subcarriers,
the max ( ) is a function configured to output a largest value among a plurality of input values, and
the min [ ] is a function configured to output a smallest value among a plurality of input values.

6. The communication method according to claim 5, wherein:
the $Q'_{min}$ is based on a number O of bits of the HARQ-ACK and a number L of CRC parity bits, and
the $Q'_{temp}$ is based on at least the number O of bits of the HARQ-ACK, the number L of CRC parity bits, and a number $N^{PUSCH\text{-}initial(x)}{sc}$ of SC-FDMA symbols for a second PUSCH for an initial transmission of the transport block.

7. A communication method for use by a base station apparatus, the communication method comprising:
receiving a HARQ-ACK by using a PUSCH that includes a transport block; and
decoding the HARQ-ACK, wherein
a number Q' of coded modulation symbols of the HARQ-ACK is given by min [max ($Q'_{temp}$, $Q'_{min}$), $4 \cdot M^{PUSCH}{sc}$],
the $M^{PUSCH}{sc}$ is a scheduled bandwidth for transmission of the PUSCH in a subframe for the transport block, and is represented by a number of subcarriers,
the max ( ) is a function configured to output a largest value among a plurality of input values, and
the min [ ] is a function configured to output a smallest value among a plurality of input values.

8. The communication method according to claim 7, wherein:
the $Q'_{min}$ is based on a number of bits of the HARQ-ACK and a number of CRC parity bits, and
the $Q'_{temp}$ is based on at least the number of bits of the HARQ-ACK, the number of CRC parity bits, and a number of a SC-FDMA symbol for a second PUSCH for an initial transmission of the transport block.

9. An integrated circuit implemented in a terminal apparatus, the integrated circuit comprising:
a transmission circuit configured to transmit a HARQ-ACK by using a PUSCH that includes a transport block; and
a coding circuit configured to code the HARQ-ACK, wherein a number Q' of coded modulation symbols of the HARQ-ACK is given by min [max ($Q'_{temp}$, $Q'_{min}$), $4 \cdot M^{PUSCH}_{sc}$], the $M^{PUSCH}_{sc}$ is a scheduled bandwidth for transmission of the PUSCH in a subframe for the transport block, and is represented by a number of subcarriers, the max ( ) is a function configured to output a largest value among a plurality of input values, and the min [ ] is a function configured to output a smallest value among a plurality of input values.

10. The integrated circuit according to claim 9, wherein:

the $Q'_{min}$ is based on a number O of bits of the HARQ-ACK and a number L of CRC parity bits, and the $Q'_{temp}$ is based on at least the number O of bits of the HARQ-ACK, the number L of CRC parity bits, and a number $N^{PUSCH-initial(x)}_{sc}$ of SC-FDMA symbols for a second PUSCH for an initial transmission of the transport block.

11. An integrated circuit implemented in a base station apparatus, the integrated circuit comprising:

a receiving circuit configured to receive a HARQ-ACK by using a PUSCH that includes a transport block; and a decoding circuit configured to decode the HARQ-ACK, wherein a number Q' of coded modulation symbols of the HARQ-ACK is given by min [max ($Q'_{temp}$, $Q'_{min}$), $4 \cdot M^{PUSCH}_{sc}$], the $M^{PUSCH}_{sc}$ is a scheduled bandwidth for transmission of the PUSCH in a subframe for the transport block, and is represented by a number of subcarriers, the max ( ) is a function configured to output a largest value among a plurality of input values, and the min [ ] is a function configured to output a smallest value among a plurality of input values.

12. The integrated circuit according to claim 11, wherein:

the $Q'_{min}$ is based on a number of bits of the HARQ-ACK and a number of CRC parity bits, and the $Q'_{temp}$ is based on at least the number of bits of the HARQ-ACK, the number of CRC parity bits, and a number of a SC-FDMA symbol for a second PUSCH for an initial transmission of the transport block.

\* \* \* \* \*